US010855913B1

(12) United States Patent
Hagio et al.

(10) Patent No.: US 10,855,913 B1
(45) Date of Patent: Dec. 1, 2020

(54) WEARABLE CAMERA, VIDEO PLAYBACK SYSTEM, AND VIDEO PLAYBACK METHOD

(71) Applicant: PANASONIC I-PRO SENSING SOLUTIONS CO., LTD., Fukuoka (JP)

(72) Inventors: Minoru Hagio, Fukuoka (JP); Shinichi Arai, Fukuoka (JP); Takae Oguchi, Fukuoka (JP)

(73) Assignee: PANASONIC I-PRO SENSING SOLUTIONS CO., LTD., Fukuoka (JP)

(*) Notice: Subject to any disclaimer, the term of this patent is extended or adjusted under 35 U.S.C. 154(b) by 0 days.

(21) Appl. No.: 16/570,098

(22) Filed: Sep. 13, 2019

(30) Foreign Application Priority Data

May 8, 2019 (JP) ................. 2019-088153

(51) Int. Cl.
*H04N 5/232* (2006.01)
*H04N 7/18* (2006.01)

(52) U.S. Cl.
CPC ... *H04N 5/23219* (2013.01); *H04N 5/232939* (2018.08); *H04N 7/185* (2013.01)

(58) Field of Classification Search
CPC ............... G06F 16/78; G06F 16/7867; H04N 21/44008; H04N 21/47217
See application file for complete search history.

(56) References Cited

U.S. PATENT DOCUMENTS

2007/0018952 A1* 1/2007 Arseneau ............... H04H 40/27 345/156
2020/0051413 A1* 2/2020 Phillips ............ G08B 13/19671

FOREIGN PATENT DOCUMENTS

JP 2016-181767 10/2016

* cited by examiner

*Primary Examiner* — Obafemi O Sosanya
(74) *Attorney, Agent, or Firm* — Greenblum & Bernstein, P.L.C.

(57) ABSTRACT

A wearable camera includes: a storage section that stores therein video data of captured moving image; and a controller that adds a bookmark signal to the video data when an event included in the video data is detected, in which the bookmark signal indicates a location at which playback of the video data starts when the video data is played back.

15 Claims, 13 Drawing Sheets

| | |
|---|---|
| DETECTION OF ACTION OF POLICE OFFICER | DASH DETECTION |
| | FALL DETECTION |
| | FIGHT DETECTION |
| LIVING BODY DETECTION | EXCITED STATE DETECTION |
| IMAGE DETECTION | PERSON DETECTION |
| | FACE DETECTION |
| | VEHICLE DETECTION |
| | NUMBER PLATE DETECTION |
| | DETECTION OF EDGED TOOL OR GUN |
| | ABNORMAL BEHAVIOR DETECTION |
| | CROWD DETECTION |
| | COLOR DETECTION |
| | DETECTION OF COLOR OF CLOTHES OF PERSON |
| | DETECTION OF COLOR OF VEHICLE |
| AUDIBLE SOUND DETECTION | CONVERSATION DETECTION |
| | DETECTION OF PREDETERMINED WORDS |
| SPECIAL SOUND DETECTION | GUNSHOT DETECTION |
| | EXPLOSION SOUND DETECTION |

FIG. 2

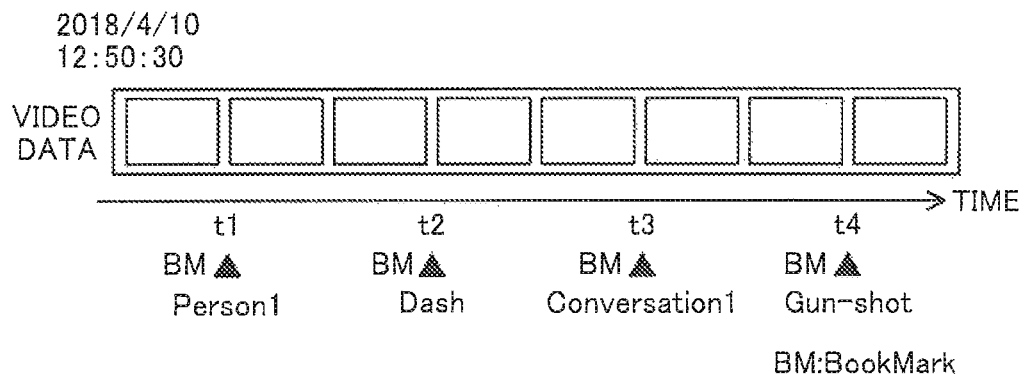

FIG. 3

WEARABLE CAMERA, VIDEO PLAYBACK SYSTEM, AND VIDEO PLAYBACK METHOD

CROSS REFERENCE TO RELATED APPLICATIONS

This application is entitled and claims the benefit of Japanese Patent Application No. 2019-088153, filed on May 8, 2019, the disclosure of which including the specification, drawings and abstract is incorporated herein by reference in its entirety.

TECHNICAL FIELD

This disclosure relates to a wearable camera, a video playback system, and a video playback method.

BACKGROUND ART

In recent years, wearable cameras have been introduced in order to support the work of police officers, security guards, or the like (for example, see PTL 1). The wearable camera is attached on the body of the police officer, the security guard, or the like or the clothes worn by them, and captures a video of a scene and the like.

The police officer, the security guard, or the like may play back, for example, the video captured (recorded) by the wearable camera on a terminal apparatus after returning to the police station or the office, and create a report on the case while watching the played back video.

CITATION LIST

Patent Literature

PTL 1

Japanese Patent Application Laid-Open No. 2016-181767

SUMMARY OF INVENTION

Technical Problem

The video data captured by the wearable camera may include videos that are not relevant to the case (report), for example. Watching a video still including videos that are not relevant to the case to create the report is time consuming in the report creation and is a problem.

A non-limiting example of this disclosure contributes to the provision of a wearable camera and a signal adding method capable of simplifying the report creation.

Solution to Problem

A wearable camera according to one aspect of the present disclosure includes: a storage section that stores therein video data of a captured moving image; and a controller that adds a bookmark signal to the video data when an event included in the video data is detected, in which the bookmark signal indicates a location at which playback of the video data starts, when the video data is played back.

A video playback system according to one aspect of the present disclosure includes: a wearable camera; and a display apparatus that plays back video data of a moving image acquired by the wearable camera, in which: the wearable camera includes: a storage section that stores therein video data of a captured moving image; and a controller that adds a bookmark signal to the video data when an event included in the video data is detected, in which the bookmark signal indicates a location at which playback of the video data starts, when the video data is played back; and the display apparatus starts playback of the video data from a location on the video data indicated by the bookmark signal.

A video playback method according to one aspect of the present disclosure is a method for a video playback system including a wearable camera and a display apparatus that plays back video data of a moving image acquired by the wearable camera, the video playback method including: storing, by the wearable camera, video data of a captured moving image; adding, by the wearable camera, a bookmark signal to the video data when an event included in the video data is detected, the bookmark signal indicating a location at which playback of the video data starts, when the video data is played back; and starting, by the display apparatus, playback of the video data from a location on the video data indicated by the bookmark signal.

Note that inclusive or specific aspects above may be implemented by a system, an apparatus, a method, an integrated circuit, a computer program, or a recording medium, and may be implemented by a freely-selected combination of the system, the apparatus, the method, the integrated circuit, the computer program, and the recording medium.

Advantageous Effects of Invention

According to one aspect of this disclosure, the report creation can be simplified.

Further advantages and effects in one example of this disclosure are clarified from the description and the accompanying drawings. Those advantages and/or effects are provided by a number of embodiments and features described in the description and the accompanying drawings, but not all necessarily need to be provided in order to obtain one or more of the same features.

BRIEF DESCRIPTION OF DRAWINGS

FIG. 2 describes an example of bookmarks added to video data of a wearable camera;

FIG. 3 describes an example of the addition of bookmarks:

DESCRIPTION OF EMBODIMENTS

Embodiments of the present invention are described in detail below with reference to the accompanying drawings, as appropriate. Unnecessarily detailed descriptions may be omitted. For example, detailed descriptions of features that are already well known or overlapping descriptions for configurations that are substantially the same may be omitted. This is for preventing the description below from becoming unnecessarily redundant, and facilitating the understanding of a person skilled in the art.

Note that the accompanying drawings and the description below are provided so that a person skilled in the art would sufficiently understand this disclosure, and it is not intended to thereby limit the subject matter described in the appended claims.

Embodiment 1

Figure 1:
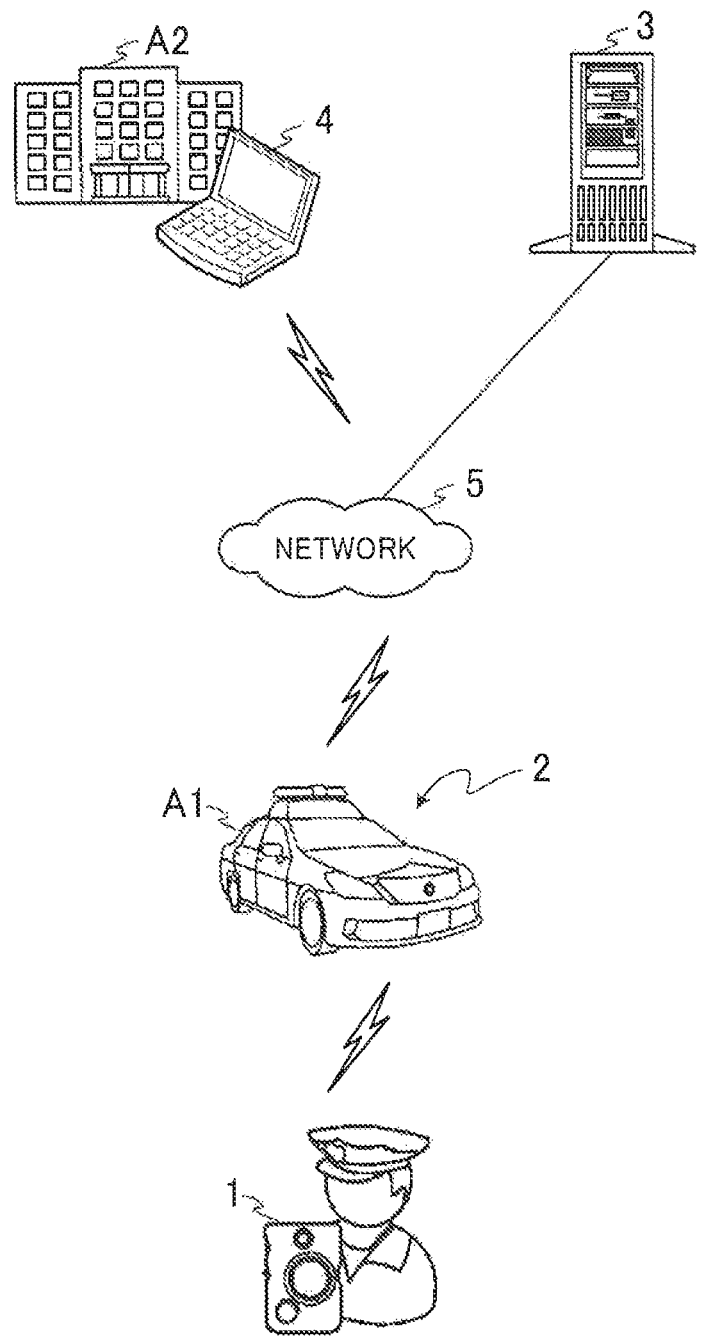
FIG. 1 illustrates a configuration example of a wearable camera system according to Embodiment 1.

FIG. 1 illustrates a configuration example of a wearable camera system according to Embodiment 1. As illustrated in FIG. 1, the wearable camera system includes wearable camera 1, in-vehicle system 2, server 3, and terminal apparatus 4.

In-vehicle system 2, server 3, and terminal apparatus 4 are connected to each other via network 5. Wearable camera 1 is connected to server 3 and terminal apparatus 4 via in-vehicle system 2 and network 5. Network 5 may include networks such as the Internet and a wireless communication network of a mobile phone and the like, for example.

Figure 11:
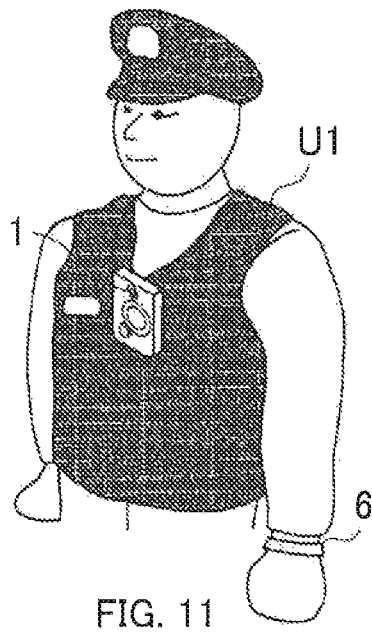
FIG. 11 illustrates an example of an upper body of a police officer wearing the wearable camera and a biological sensor.

Wearable camera 1 is worn on or possessed by a police officer, for example (for example, see FIG. 11). Wearable camera 1 communicates with in-vehicle system 2 by short-range wireless communication such as Wi-Fi® or Bluetooth®, for example.

In-vehicle system 2 is installed in police vehicle A1, for example. In-vehicle system 2 includes an in-vehicle camera (not shown), a control apparatus (not shown) such as a personal computer, and a communicate apparatus (not shown), for example.

In-vehicle system 2 receives video data that is captured by wearable camera 1 from wearable camera 1, for example. In-vehicle system 2 transmits the video data received from wearable camera 1 to server 3 via network 5. In-vehicle system 2 transmits the video data captured by the in-vehicle camera to server 3 via network 5.

Server 3 stores the video data captured by wearable camera 1 and the video data captured by the in-vehicle camera of in-vehicle system 2 therein. Server 3 stores a report created by terminal apparatus 4 and the like therein.

Terminal apparatus 4 is used by a police officer in police station A2, for example. Terminal apparatus 4 accesses server 3 in accordance with the operation by the police officer, and displays the video data stored in server 3 on the display apparatus. Terminal apparatus 4 creates a report relating to the case and the like, for example, in accordance with the operation by the police officer. Terminal apparatus 4 transmits the created report to server 3 via network 5.

Note that wearable camera 1 is connected to server 3 and terminal apparatus 4 via in-vehicle system 2 and network 5, but the present invention is not limited thereto. Wearable camera 1 may be connected to server 3 and terminal apparatus 4 via network 5 and not via in-vehicle system 2.

FIG. 2 describes an example of bookmarks added to the video data of wearable camera 1. Wearable camera 1 detects a predetermined event. For example, wearable camera 1 detects an event shown in the right column in FIG. 2. When wearable camera 1 detects an event shown in the right column in FIG. 2, wearable camera 1 adds a bookmark signal (hereinafter may be referred to as a bookmark) including the detected event content to the video data that is being captured (for example, see FIG. 3).

For example, wearable camera 1 detects the dash, the fall, or the fight with a suspect of the police officer wearing wearable camera 1 by a gyro sensor and an acceleration sensor described below. When wearable camera 1 detects the dash, the fall, or the tight with the suspect of the police officer, wearable camera 1 adds a bookmark indicating that the police officer has dashed, fell, or fought with the suspect to the video data.

Wearable camera 1 detects the excited state of the police officer wearing wearable camera 1 by a biological sensor described below. When wearable camera 1 detects the excited state of the police officer, wearable camera 1 adds a bookmark indicating that the police officer has entered an excited state to the video data.

When a predetermined image is included in the video data that is being captured, wearable camera 1 detects that a predetermined image is included in the video data. When wearable camera 1 detects that a predetermined image is included in the video data, wearable camera 1 adds a bookmark indicating that a predetermined image is included to the video data. As shown in the image detection in FIG. 2, the predetermined images to be detected include a person, a face, a vehicle, a number plate, an edged tool or a gun, abnormal behavior of a person, a crowd, color, the color of the clothes of a person, and the color of the vehicle, for example. The color may be color other than the color of the clothes of a person and the vehicle, and may be the color of a building and the like, for example.

When a conversation or predetermined words are included in the sound collected by a microphone described below, wearable camera 1 detects that a conversation or predetermined words are included in the collected sound. When wearable camera 1 detects that a conversation or predetermined words are included in the collected sound, wearable camera 1 adds a bookmark indicating that a conversation or predetermined words are included to the video data.

When a gunshot or an explosion sound are included in the sound collected by the microphone described below, wearable camera 1 detects that a gunshot or an explosion sound are included in the collected sound. When wearable camera 1 detects that a gunshot or an explosion sound are included in the collected sound, wearable camera 1 adds a bookmark indicating that a gunshot or an explosion sound are included to the video data.

Note that the events detected by wearable camera 1 may be classified into the detection of an action of the police officer, the living body detection, the image detection, the audible sound detection, and the special sound detection, for example, as shown in the left column in FIG. 2.

The bookmark added to the video data may be referred to as attribute information, a tag, or metadata.

The event may be understood to be an event relevant to the case. For example, when the suspect suddenly starts to run, the police officer starts to run in order to chase the suspect. Therefore, the "dash detection" in FIG. 2 can be said to be an event relevant to the case.

FIG. 3 describes an example of the addition of bookmarks. FIG. 3 illustrates some frames of the video data captured by wearable camera 1. The horizontal axis in FIG. 3 indicates time.

At time t1, wearable camera 1 detects a person front the video data that is being captured. In this case, a bookmark including time t1 and an event indicating that the person is detected is added to the video data.

At time t2, wearable camera 1 detects a dash of the police officer wearing wearable camera 1 from the acceleration sensor and the gyro sensor described below. In this case, a bookmark including time t2 and an event indicating that the dash is detected is added to the video data.

At time t3, wearable camera 1 detects a conversation from the audible sound in the video data. In this case, a bookmark including time t3 and an event indicating that a conversation is detected is added to the video data.

At time t4, wearable camera 1 detects a gunshot from the audible sound in the video data. In this case, a bookmark including time t4 and an event indicating that a gunshot is detected is added to the video data.

Note that the bookmark may include the place in which the event is detected and the like besides the time and the information indicating the event content as described in FIG. 5 to FIG. 9.

The operation example in FIG. 1 is described. The police officer starts image capturing on wearable camera 1. When wearable camera 1 detects a predetermined event from the sensor, the video, and the audible sound from the microphone, wearable camera 1 adds a bookmark to the video data. For example, when wearable camera 1 detects an event shown in the right column in FIG. 2, wearable camera J adds a bookmark to the video data as illustrated in FIG. 3.

The police officer ends the image capturing on wearable camera 1. The police officer transmits the video data of wearable camera 1 to server 3 via in-vehicle system 2 and network 5.

The police officer returns to police station A2, and creates a report on the case with use of terminal apparatus 4. For example, the police officer accesses server 3 with use of terminal apparatus 4, and plays back the video data with which a report on the case is to be created on terminal apparatus 4. The police officer creates a report on the case on the basis of the video data played back on terminal apparatus 4.

Figure 4:
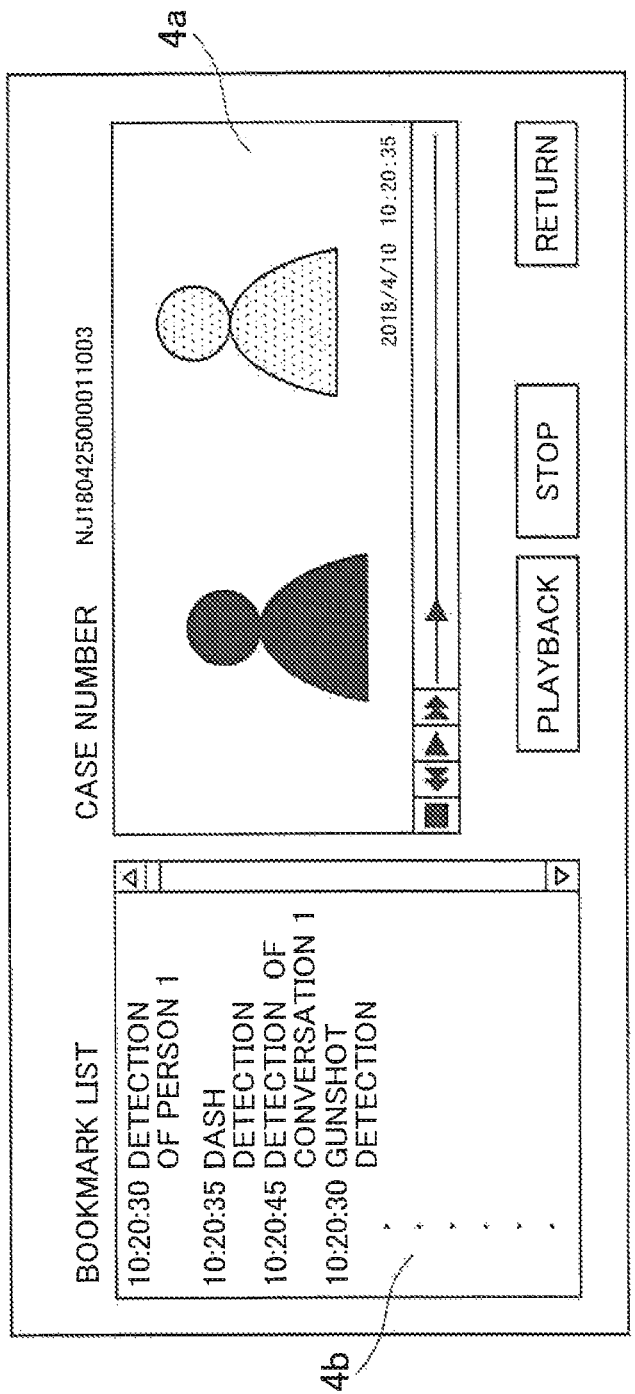
FIG. 4 illustrates a playback screen example of a terminal apparatus.

FIG. 4 illustrates a playback screen example of terminal apparatus 4. Terminal apparatus 4 accepts information on the video data to be played back from the police officer. Terminal apparatus 4 accesses server 3 and receives the video data corresponding to the accepted information from the police officer. Terminal apparatus 4 displays the video of the received video data on the display apparatus as illustrated in playback screen 4a in FIG. 4.

The video data includes the bookmarks. Terminal apparatus 4 displays the bookmarks included in the video data as illustrated in bookmark list 4b in FIG. 4.

On bookmark list 4b, the time at which the bookmark is added to the video data, and the event content of the bookmark added at the time are displayed in association with each other. When a bookmark displayed on bookmark list 4b is selected, terminal apparatus 4 starts the playback from the video place in the video data of the selected bookmark. For example, when the "conversation detection" in bookmark list 4b is selected, terminal apparatus 4 plays back the video from the place of the bookmark of the "conversation detection" or the time included in the bookmark of the "conversation detection". In other words, terminal apparatus 4 cues the video from the place selected in bookmark list 4b.

As described above, wearable camera 1 detects an event, and adds a bookmark including the time at which the event is detected and the content of the detected event to the video data that is being captured. As a result, terminal apparatus 4 can play back the video data from the place at which the bookmark is added or the time included in the bookmark. Therefore, the creation of the report on the case becomes easier for the police officer.

For example, when the police officer writes the content of conversation with the suspect in the report, the police officer selects the "conversation detection" in bookmark list 4b in FIG. 4. Terminal apparatus 4 plays back the video data from the place at which the bookmark of the "conversation detection" is added. When the police officer writes the situation in which a gunshot has occurred in the report, the police officer selects the "gunshot detection" in bookmark list 4b in FIG. 4. Terminal apparatus 4 plays back the video data from the place at which the bookmark of the "gunshot detection" is added. As a result, the police officer can play back the video from the video place from which the police officer desires to report the case, and the creation of the report becomes easier.

Note that, in wearable camera 1, the detected event content may be added, erased, and changed by a server (not shown) in police station A2. For example, the color in the "detection of color of clothes of person" shown in FIG. 2 may be changed by the server in police station A2. The words in the "detection of predetermined words" shown n FIG. 2 may be changed by the server in police station A2.

Another example of the addition of the bookmarks by wearable camera 1 is described. Wearable camera 1 may include location information of wearable camera 1 in the bookmark added to the video data. In other words, wearable camera 1 may include the information on the capturing place in the bookmark. Wearable camera 1 can acquire the current location information by a Global Positioning System (GPS) described below, for example.

Figure 5:
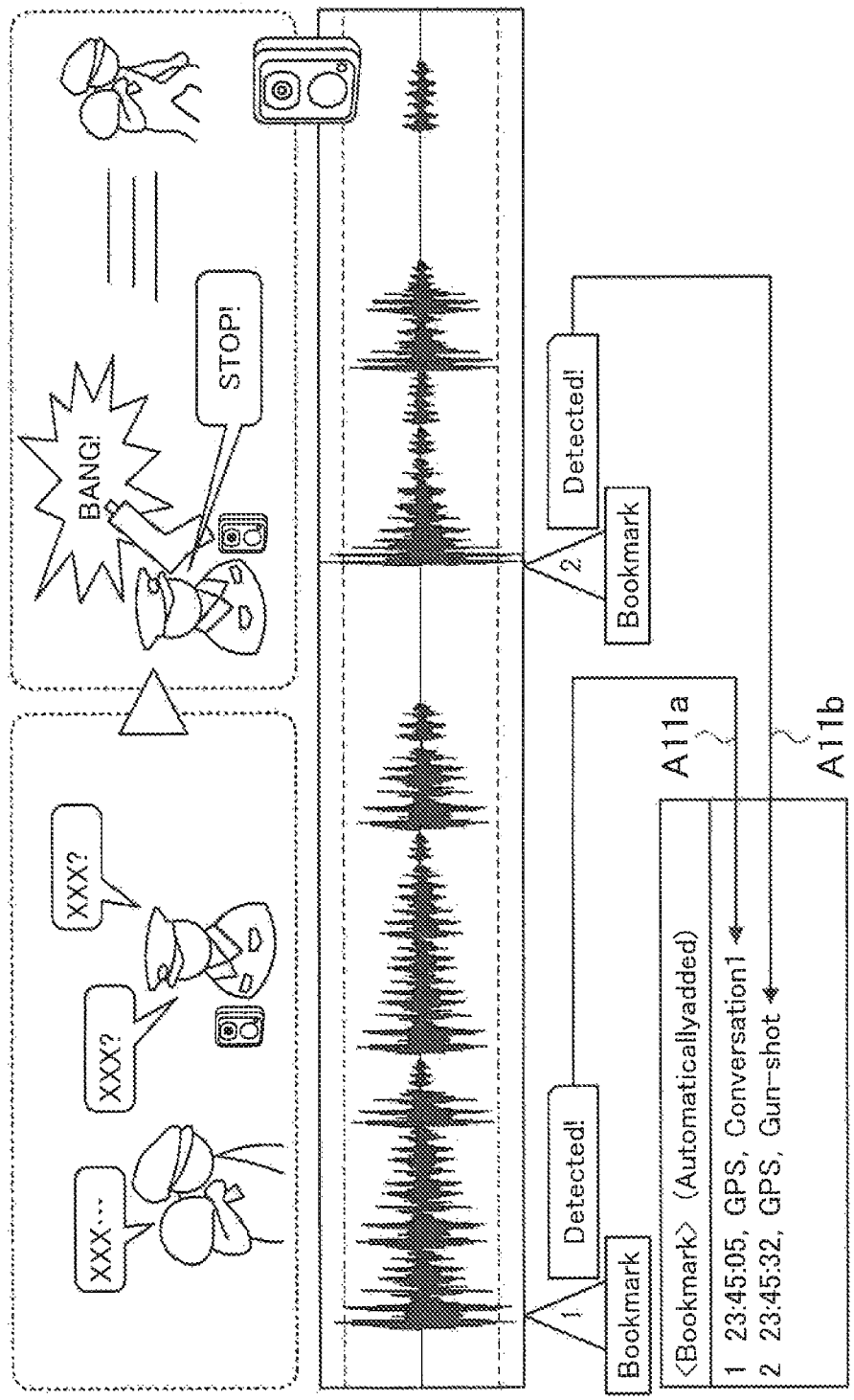
FIG. 5 describes an example of the addition of bookmarks.

FIG. 5 describes an example of the addition of bookmarks. Wearable camera 1 collects the sound by the microphone described below, and detects a predetermined sound. When wearable camera 1 detects a predetermined sound, wearable camera 1 adds a bookmark to the video data.

For example, when wearable camera 1 detects "conversation" from the collected sound, wearable camera 1 adds a bookmark indicated by arrow A11a in FIG. 5 to the video data. In the bookmark indicated by arrow A11a in FIG. 5, the time at which the event of "conversation" is detected, the place, and the bookmark classification are included. The bookmark classification may be understood to be information indicating the content of the detected event.

For example, when wearable camera 1 detects "gunshot" from the collected sound, wearable camera 1 adds a bookmark indicated by arrow A11b in FIG. 5 to the video data. The bookmark indicated by arrow A11b in FIG. 5 includes the time at which the event of "gunshot" is detected, the place, and the bookmark classification.

Note that the video data may include a plurality of conversations. Wearable camera 1 may distinguish a plurality of conversations, and add identifiers to the bookmark classifications of the bookmarks corresponding to the conversations. For example, when three conversations are included in the video data, wearable camera 1 may add numbers to the bookmark classifications included in the three bookmarks corresponding to the three conversations as identifiers. For example, wearable camera 1 may set the bookmark classifications included in each of the three bookmarks to be "Conversation 1", "Conversation 2" and "Conversation 3".

Figure 6:
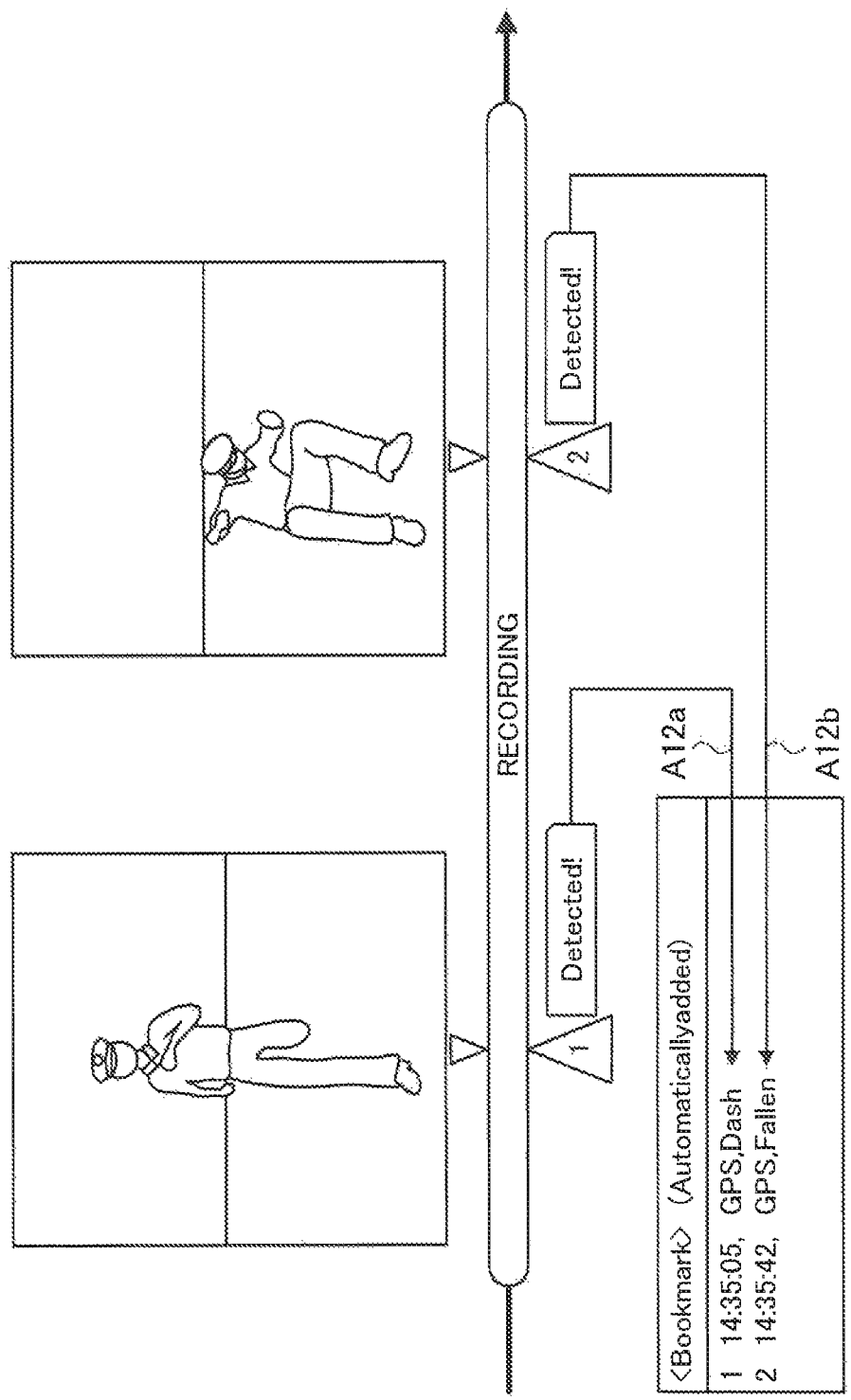
FIG. 6 describes an example of the addition of bookmarks.

FIG. 6 describes an example of the addition of bookmarks. Wearable camera 1 detects a predetermined movement of the police officer wearing wearable camera 1 by the acceleration sensor and the gyro sensor described below. When wearable camera 1 detects a predetermined movement of the police officer, wearable camera 1 adds a bookmark to the video data.

For example, when wearable camera 1 detects a dash of the police officer from the signal of the sensor, wearable camera t adds a bookmark indicated by arrow A) 2a in FIG. 6 to the video data. The bookmark indicated by arrow A12a in FIG. 6 includes the time at which the event of "dash" is detected, the place, and the bookmark classification.

For example, when wearable camera 1 detects the fall of the police officer from the signal of the sensor, wearable camera 1 adds a bookmark indicated by arrow A12b in FIG. 6 to the video data. The bookmark indicated by arrow A12b in FIG. 6 includes the time at which the event of "fall" is detected, the place, and the bookmark classification.

Figure 7:
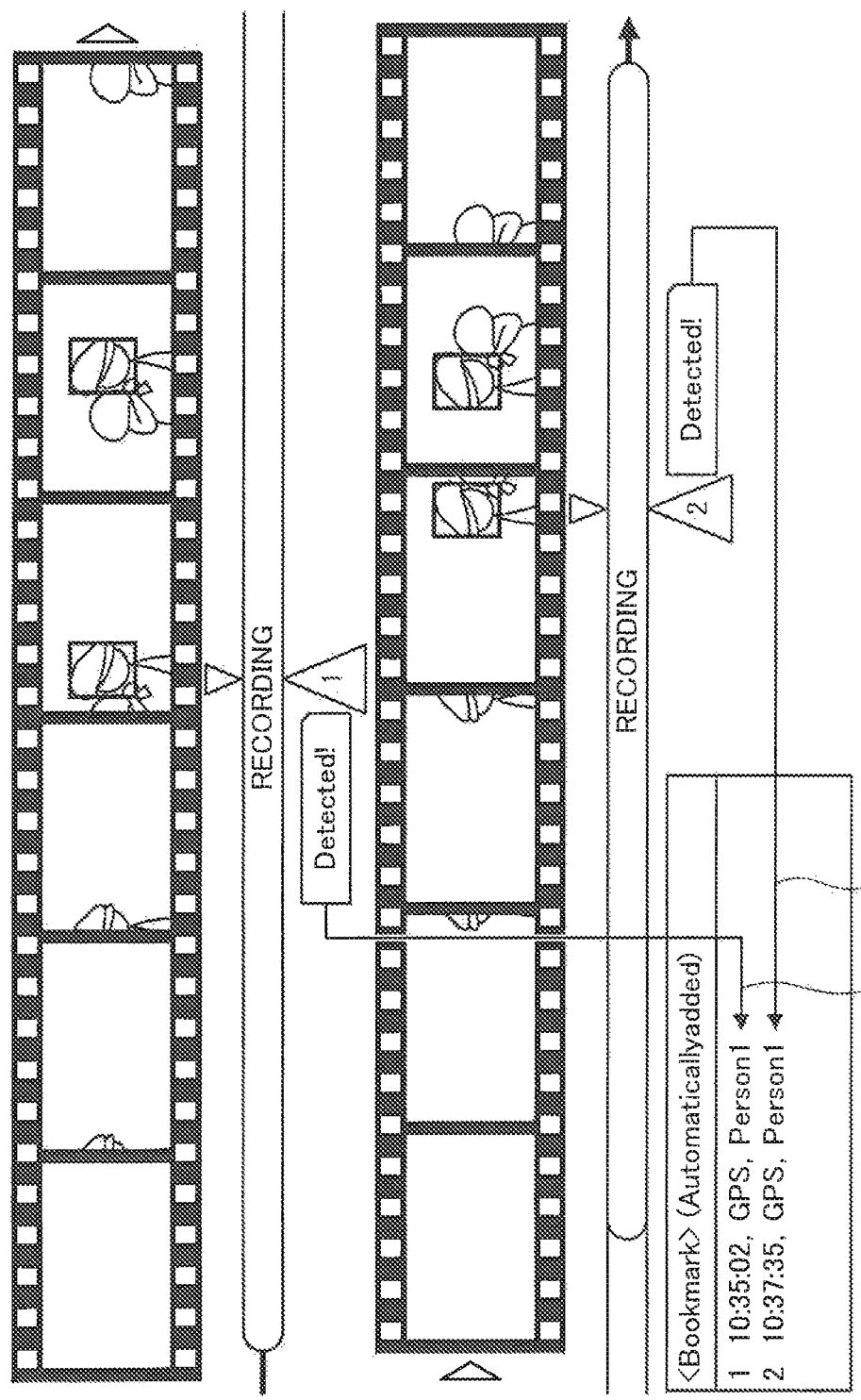
FIG. 7 describes an example of the addition of bookmarks.

FIG. 7 describes an example of the addition of bookmarks. Wearable camera 1 detects a predetermined image from the video data. For example, wearable camera 1 detects a person, a face, a vehicle, a number plate, an edged tool or a gun, an abnormal behavior, a crowd, color, the color of the clothes of a person, and the color of a vehicle included in the video data by image analysis. When wearable camera 1 detects a predetermined image from the video data, wearable camera 1 adds a bookmark to the video data.

For example, when wearable camera 1 detects a person from the video data at a certain time, wearable camera 1 adds a bookmark indicated by arrow A13a in FIG. 7 to the video data. The bookmark indicated by arrow A13a in FIG. 7 includes the time at which the event of "person" is detected, the place, and the bookmark classification.

For example, when wearable camera 1 detects a person from the video data at another time, wearable camera 1 adds a bookmark indicated by arrow A13b in FIG. 7 to the video data. The bookmark indicated by arrow A13b in FIG. 7 includes the time at which the event of "person" is detected, the place, and the bookmark classification.

Note that the video data may include a purality of different people. Wearable camera 1 may distinguish the plurality of different people, and add identifiers to the bookmark classifications of the bookmarks corresponding to the people. For example, when three people are included in the video data, wearable camera 1 may add numbers to the bookmark classifications included in three bookmarks corresponding to the three people as identifiers. For example, wearable camera 1 may set the bookmark classifications included in the three bookmarks to be "Person 1", "Person 2", and "Person 3". The person illustrated in FIG. 7 is the same person, and hence the bookmarks indicated by arrows A13a and A13b include the same "Person 1" as the bookmark classification.

Figure 8:
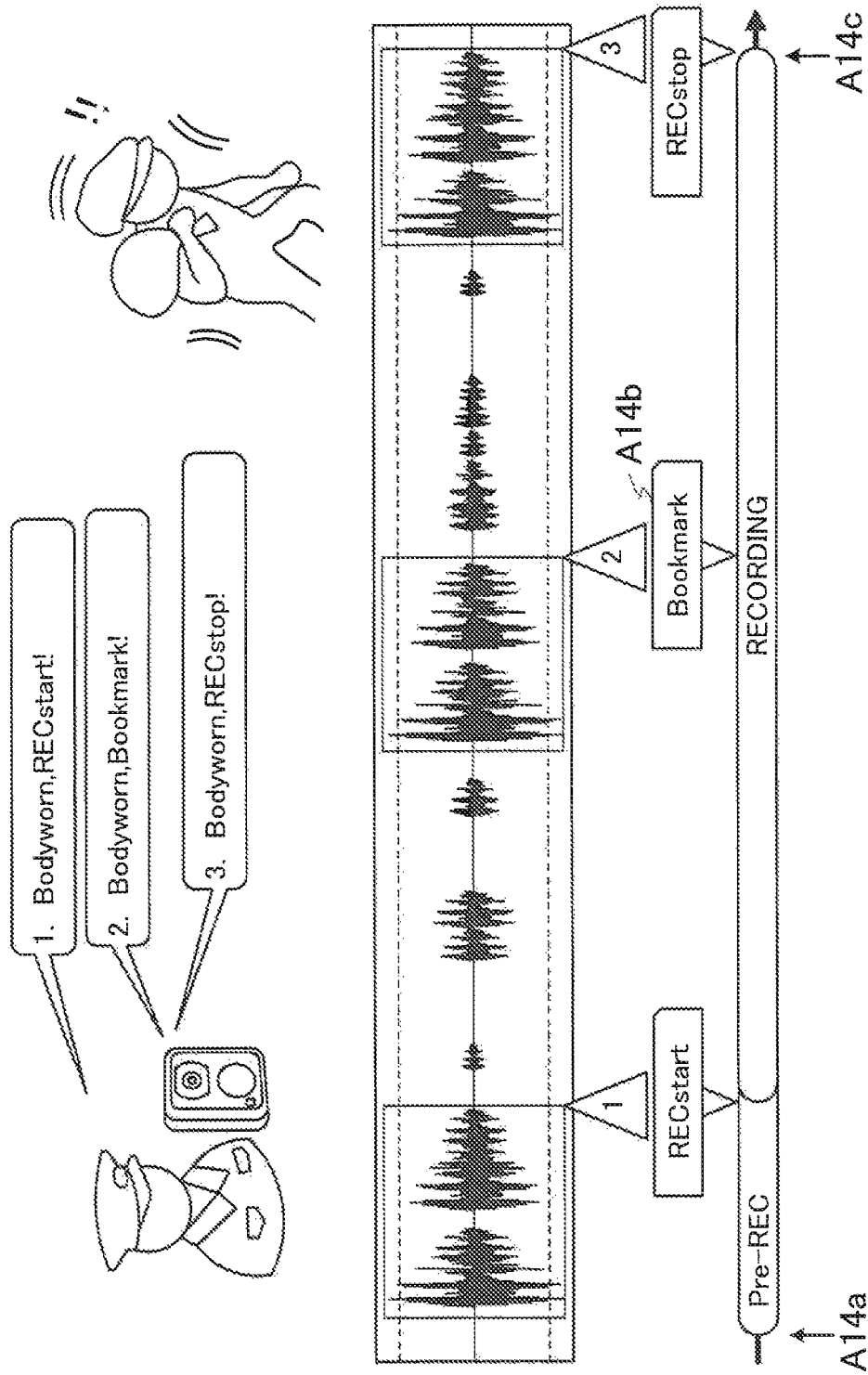
FIG. 8 describes an example of the addition of bookmarks.

FIG. 8 describes an example of the addition of bookmarks. Wearable camera 1 may add a bookmark to the video data in accordance with predetermined words from the police officer possessing wearable camera 1.

Wearable camera 1 may start recording in accordance with predetermined words from the police officer possessing wearable camera 1. Wearable camera 1 may stop recording in accordance with predetermined words from the police officer possessing wearable camera 1.

For example, wearable camera 1 may perform pre-recording. Wearable camera 1 starts recording from a pre-recorded video indicated by arrow A14a in FIG. 8 when the police officer says "REC start", for example.

For example, when the police officer says "Bookmark", wearable camera 1 adds a bookmark indicated by mow A14b in FIG. 8 to the video data. The bookmark indicated by arrow A14b in FIG. 8 includes the time at which the event of the audible sound "Bookmark" is detected, the place, and the bookmark classification.

For example, when the police officer says "REC stop", wearable camera 1 stops recording the video data as indicated by arrow A14c in FIG. 8.

As described above, wearable camera 1 includes a bookmark in the video data in accordance with predetermined words spoken by the police officer. As a result, the police officer can add a bookmark in the place in the video data that the police officer desires to watch when creating a report by saying predetermined words during the recording of the video data.

Wearable camera 1 starts and stops recording in accordance with the words spoken by the police officer. As a result, the police officer can easily start and stop recording without operating a switch of wearable camera 1.

Figure 9:
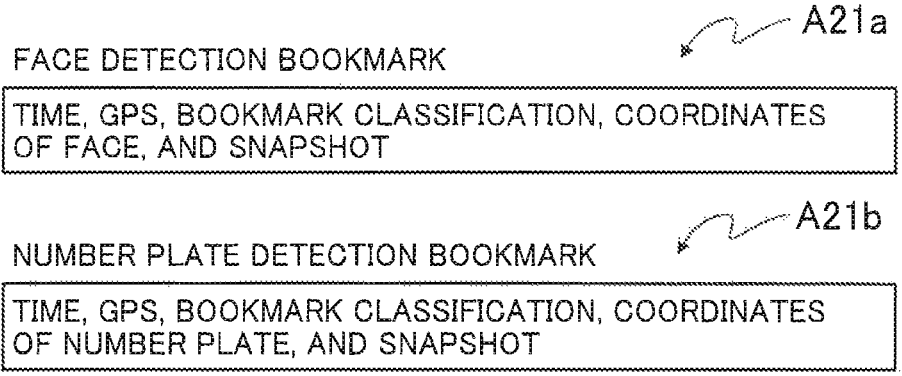
FIG. 9 illustrates an example of bookmarks of the face detection and the number plate detection.

FIG. 9 illustrates an example of bookmarks of the face detection and the number plate detection. In the description above, the bookmark includes the time, the place, and the bookmark classification, but the present invention is not limited thereto. In the face detection, wearable camera 1 may include the coordinates of the face on the image, and a snapshot of the face in the bookmark. In the number plate detection, wearable camera 1 may include the coordinates of the number plate on the image, and a snapshot of the number plate in the bookmark.

For example, as indicated by arrow A21a in FIG. 9, the bookmark of the face detection may include the time, the place, the bookmark classification, the coordinates indicating the location of the face on the image, and a snapshot of the face. The bookmark classification for the face detection may include identifiers for identifying faces, for example, as with the bookmark classification for the person detection in FIG. 7. For example, the bookmark classification for the face detection may be indicated as "face 1", "face 2", and "face 3".

For example, as indicated by arrow A21b in FIG. 9, the bookmark of the number plate detection may include the time, the place, the bookmark classification, the coordinates indicating the location of the number plate on the image, and a snapshot of the number plate. The bookmark classification for the number plate detection may include identifiers for identifying number plates, for example, as with the bookmark classification for the person detection in FIG. 7. For example, the bookmark classification for the number plate detection may be indicated as "plate 1", "plate 2", and "plate 3".

When wearable camera 1 includes the coordinates of the face in the bookmark of the face detection, terminal apparatus 4 can place a blur on the face included in the video data when the video data is played back. When wearable camera 1 includes the coordinates of the number plate in the bookmark of the number plate detection, terminal apparatus 4 can place a blur on the number plate included in the video data when the video data is played back.

Figure 10:
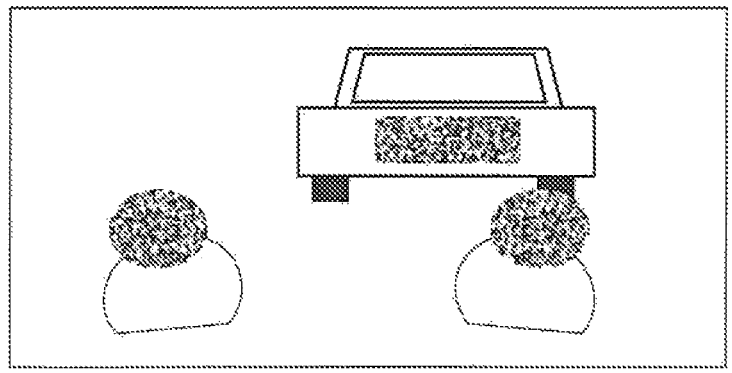
FIG. 10 illustrates a playback screen example of the terminal apparatus.

FIG. 10 illustrates a playback screen example of terminal apparatus 4. The playback screen example in FIG. 10 partially omits the illustration of bookmark list 4b, a playback button, and the like with respect to the playback screen example illustrated in FIG. 4.

As described above, wearable camera 1 includes the coordinates of the face in the bookmark of the face detection. Wearable camera 1 includes the coordinates of the number plate in the bookmark of the number plate detection. As a result, as illustrated in FIG. 10, terminal apparatus 4 can place a blur on the face and the number plate that appear on the playback screen of the video data.

For example, the video data includes the bookmark of the face detection. Terminal apparatus 4 displays the face on the screen by placing a blur on the face on the screen on the basis of the coordinates indicating the location of the face included in the bookmark of the face detection.

For example, the video data includes the bookmark of the number plate detection. Terminal apparatus 4 displays the number plate on the screen by placing a blur on the number plate on the screen on the basis of the coordinates indicating the location of the number plate included in the bookmark of the number plate detection.

As described above, wearable camera 1 includes the coordinates of the face on the image in the bookmark of the face detection. Wearable camera 1 includes the coordinates of the number plate on the image in the bookmark of the number plate detection. As a result, terminal apparatus 4 can place a blur on the face and the number plate when the video data is played back, and can protect privacy.

Note that, as described in FIG. 9, the bookmark classification in the bookmark of the face detection may include identifiers for identifying faces. Terminal apparatus 4 may distinguish faces on the basis of the identifiers in the bookmark classification, and place a blur on the fac. For example, terminal apparatus 4 can place a blur on the face of a person other than the suspect or the criminal, and prevent the blur from being placed on the face of the suspect or the criminal in accordance with the operation by the police officer that operates terminal apparatus 4.

As described in FIG. 9, the bookmark classification in the bookmark of the number plate detection may include identifiers for identifying number plates. Terminal apparatus 4 may distinguish number plates on the basis of the identifiers in the bookmark classification, and place a blur on the number plates. For example, terminal apparatus 4 can place a blur on the number plate of a vehicle other than the vehicle of the suspect or the criminal, and prevent the blur horn being placed on the number plate of the vehicle of the suspect or the criminal in accordance with the operation by the police officer that operates terminal apparatus 4.

In the description above, the bookmark classification includes identifiers for identifying faces, but the present invention is not limited thereto. Wearable camera 1 may include identifiers for identifying faces in the bookmark apart from the bookmark classification. In this case, the bookmark classification does not necessarily need to include identifiers for identifying faces.

In the description above, the bookmark classification includes identifiers for identifying number plates, but the present invention is not limited thereto. Wearable camera 1 may include identifiers for identifying number plates in the bookmark apart from the bookmark classification. In this case, the bookmark classification does not necessarily need to include identifiers for identifying number plates.

Also for the bookmark classification for the conversation detection described in FIG. 5 and the bookmark classification for the person detection described in FIG. 7, each bookmark classification does not necessarily need to include identifiers as with the bookmark of the face detection and the bookmark of the number plate detection. The identifiers for identifying conversations and identifiers for identifying people may be included in the bookmarks apart from the bookmark classifications.

FIG. 11 illustrates an example of the upper body of the police officer wearing wearable camera 1 and biological sensor 6. In FIG. 11, the same parts as those in FIG. are denoted by the same reference characters.

Wearable camera 1 is worn or held on the front part of the uniform of police officer U1 so as to take an image ahead of police officer U1. Wearable camera 1 may be fixed on the front part of the uniform in a state of being hung from the neck with a strap, for example. Wearable camera 1 may be fixed on the front part of the uniform by engaging an attachment (for example, an attachment clip) that is attached to a rear surface of a case of wearable camera 1 with a counterpart attachment that is attached to the front part of the uniform with each other.

Biological sensor 6 is worn on the wrist of police officer U1, for example. Biological sensor 6 acquires living body information such as the heart rate, sweating, and the body temperature of police officer U from the wrist of police officer U1. Biological sensor 6 transmits the acquired living body information to wearable camera 1.

Wearable camera 1 receives the living body information transmitted from biological sensor 6. Wearable camera 1 determines whether the police officer wearing wearable camera 1 is in an excited state on the basis of the received living body information. When wearable camera 1 detects the excited state of the police officer during the recording of the video data, wearable camera 1 adds a bookmark to the video data.

Figure 12:
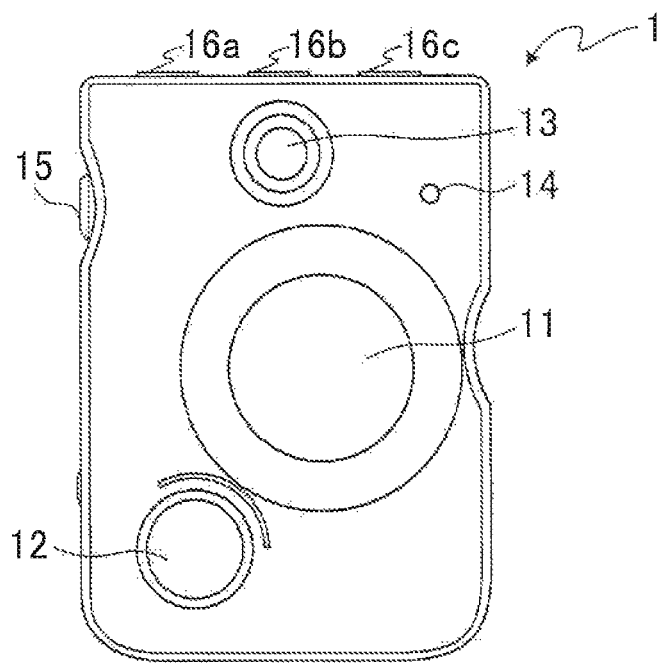
FIG. 12 illustrates an external appearance example of the wearable camera.

FIG. 12 illustrates an external appearance example of wearable camera 1. As illustrated in FIG. 12, switches 11 and 12, camera lens 13, and microphone 14 are disposed on the front surface of the case of wearable camera 1. Switch 15 is disposed on the side surface of the case of wearable camera 1. Light emitting diodes (LEDs) 16a to 16c are disposed on the upper surface of the case of the wearable camera.

Wearable camera 1 starts image capturing (recording) a moving image when switch 11 is short-pressed. Wearable camera 1 stops image capturing (recording) the moving image when the switch 11 is long-pressed.

Wearable camera 1 captures (records) a still image in accordance with the pressing of switch 12.

Camera lens 13 forms an optical image of an object on an imaging surface of an imaging element.

Microphone 14 collects the sound around wearable camera 1.

Wearable camera 1 communicates with external devices in accordance with the pressing of switch 15. For example, wearable camera 1 transmits information (including recorded video data) stored in a storage section described below to in-vehicle system 2 in accordance with the pressing of switch 15.

LEDs 16a to 16c indicate the state of wearable camera 1. For example, LEDs 16a to 16c indicate whether wearable camera 1 is recording or not. LEDs 16a to 16c indicate whether wearable camera 1 is communicating with an external device or not, for example.

Figure 13:
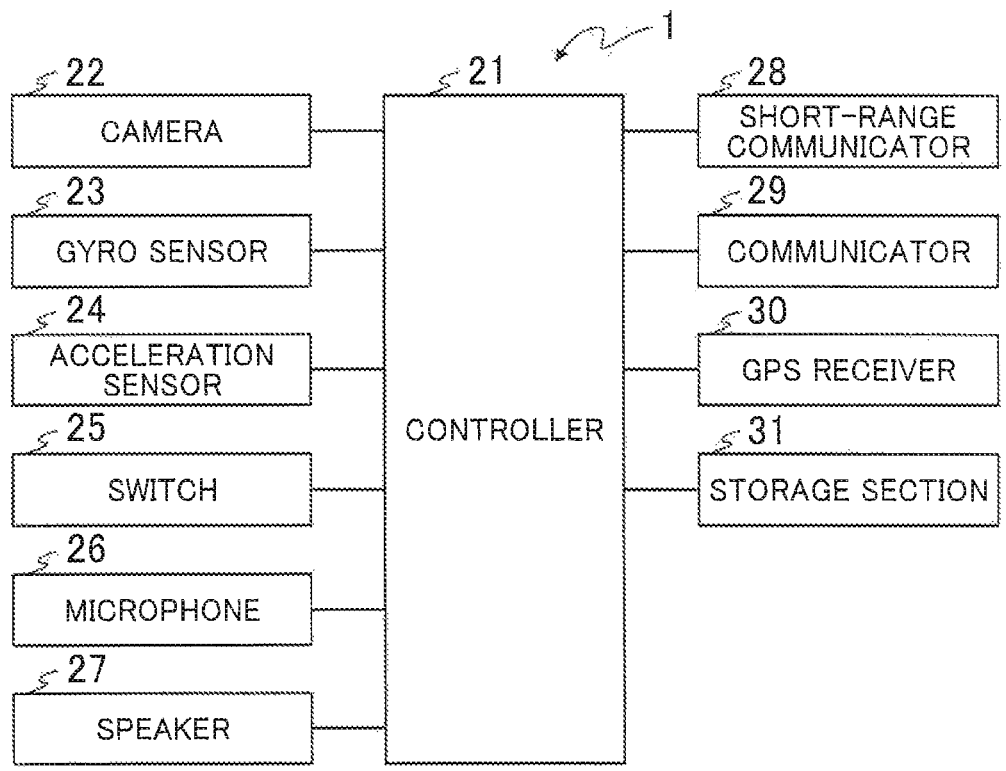
FIG. 13 illustrates a block configuration example of the wearable camera.

FIG. 13 illustrates a block configuration example of wearable camera 1. As illustrated in FIG. 13, wearable camera 1 includes controller 21, camera 22, gyro sensor 23, acceleration sensor 24, switch 25, microphone 26, speaker 27, short-range communicator 28, communicator 29, GPS receiver 30, and storage section 31.

Controller 21 controls the entirety of wearable camera 1. The functions of controller 21 may be implemented by processors such as a central processing unit (CPU) and a digital signal processor (DSP), for example.

Camera 22 includes an imaging element, and camera lens 13 illustrated in FIG. 12. The imaging element is a charge coupled device (CCD) image sensor or a complementary metal oxide semiconductor (CMOS) image sensor, for example. Camera 22 outputs a video signal output from the imaging element to controller 21 as a digital signal, for example. Controller 21 stores the digital signal output from camera 22 to storage section 31.

Gyro sensor 23 measures the angular velocity about three axes (an x-axis, a y-axis, and a z-axis) of a rectangular coordinate system, for example. Gyro sensor 23 outputs the measured angular velocity to controller 21 as a digital signal, for example.

Acceleration sensor 24 measures the acceleration of the rectangular coordinate system in the direction of the three axes, for example. Acceleration sensor 24 outputs the measured acceleration to controller 21 as a digital signal, for example. Controller 21 detects the movements of the police officer wearing wearable camera 1 starting to walk, starting to run, fall, fighting, and the like from the angular velocity output from gyro sensor 23 and the acceleration output from acceleration sensor 24.

Switch 25 is an input apparatus that accepts the operation of the user. Switch 25 corresponds to switches 11, 12, and 15 illustrated in FIG. 12. Switch 25 outputs information in accordance with the operation of the user to controller 21 as a digital signal, for example.

Microphone 26 collects the sound around wearable camera 1 or the voice of the police officer wearing wearable camera 1. Microphone 26 corresponds to microphone 14 illustrated in FIG. 12. Microphone 26 outputs the signal of the collected sound to controller 21 as a digital signal, for example. Microphone 26 can be understood to be a sensor that collects sound.

Speaker 27 converts the audible sound signal output from controller 21 into audible sound, and outputs the audible sound.

Short-range communicator 28 performs short-range wireless communication with in-vehicle system 2 of police vehicle A1 by Wi-Fi or Bluetooth, for example. Short-range communicator 28 performs wireless communication with biological sensor 6 by short-range wireless communication such as Wi-Fi or Bluetooth, for example.

Note that short-range communicator 28 may perform short-range wireless communication with in-vehicle system 2 via a mobile terminal such s a smartphone possessed by the police officer, for example. Short-range communicator 28 may perform short-range wireless communication with biological sensor 6 via a mobile terminal such as a smartphone possessed by the police officer, for example.

Communicator 29 communicates with server 3 via network 5.

GPS receiver 30 receives a GPS signal transmitted from a plurality of GPS transmitters. GPS receiver 30 calculates the location of wearable camera 1 on the basis of the received GPS signal. GPS receiver 30 outputs the calculated location of wearable camera 1 to controller 21. Note that the location of wearable camera 1 may be calculated by controller 21 on the basis of the GPS signal received by GPS receiver 30.

Images (moving images or still images) taken by camera 22 are stored in storage section 31. The images stored in storage section 31 are saved as evidence images, for example, and cannot be erased. In storage section 31, a program or data executed by a processor may be stored. Storage section 31 may be formed by a read only memory (ROM), a random access memory (RAM), a flash memory, and a hard disk drive (HDD), for example. The storage section that stores the video data therein and the storage section that stores the program or the data therein may be different storage sections.

Figure 14:
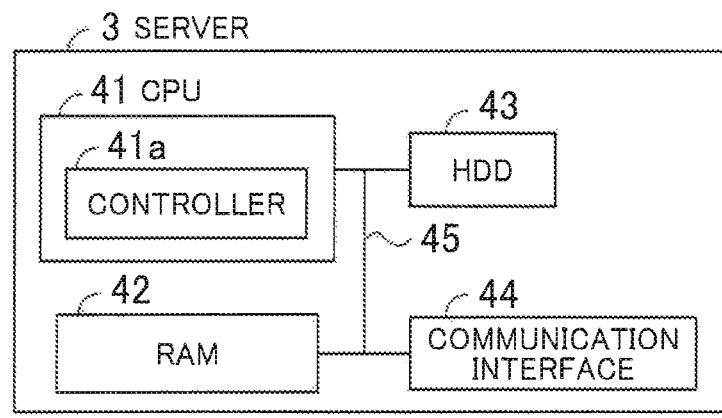
FIG. 14 illustrates a block configuration example of a server.

FIG. 14 illustrates a block configuration example of server 3. As illustrated in FIG. 14, server 3 includes CPU 41, RAM 42, HDD 43, communication interface 44, and bus 45.

The entire apparatus of server 3 is controlled by CPU 41. CPU 41 functions as controller 41a by the execution of the program. RAM 42, HDD 43, and communication interface 44 are connected to CPU 41 via bus 45.

In RAM 42, an application program and a program of an operating system (OS) to be executed by CPU 41 are temporarily stored. In RAM 42, various data necessary for the processing by CPU 41 are temporarily stored.

In HDD 43, an OS, an application program, and the like are stored. In HDD 43, the video data of the video captured by wearable camera worn on the user and the in-vehicle camera installed in police vehicle A1 are stored.

Communication interface 44 communicates with in-vehicle system 2 and terminal apparatus 4 via network 5.

Figure 15:
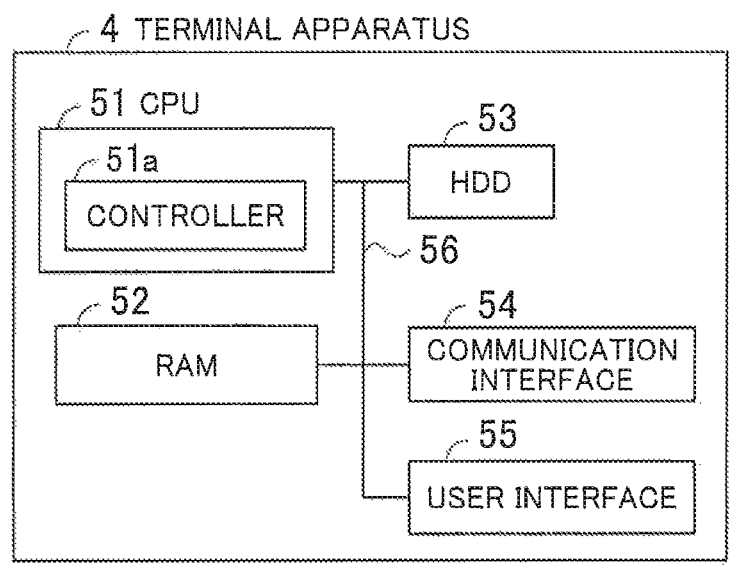
FIG. 15 illustrates a block configuration example of the terminal apparatus.

FIG. 15 illustrates a block configuration example of terminal apparatus 4. As illustrated in FIG. 15, terminal apparatus 4 includes CPU 51, RAM 52, HDD 53, communication interface 54, user interface 55, and bus 56.

The entire apparatus of terminal apparatus 4 is controlled by CPU 51. CPU 51 functions as controller 51a by the execution of the program. CPU 51 is connected to RAM 52, HDD 53, communication interface 54, and user interface 55 via bus 56.

In RAM 52, an application program and a program of an OS to be executed by CPU 51 are temporarily stored. In RAM 52, various data necessary for the processing by CPU 51 is temporarily stored.

In HDD 53, an OS, an application program, and the like are stored.

Communication interface 54 communicates with server 3 and in-vehicle system 2 of police vehicle A1 via network 5.

A keyboard apparatus and a display, for example, are connected to user interface 55. CPU 51 exchanges data with the keyboard apparatus, the display, and the like via user interface 55.

Figure 16:
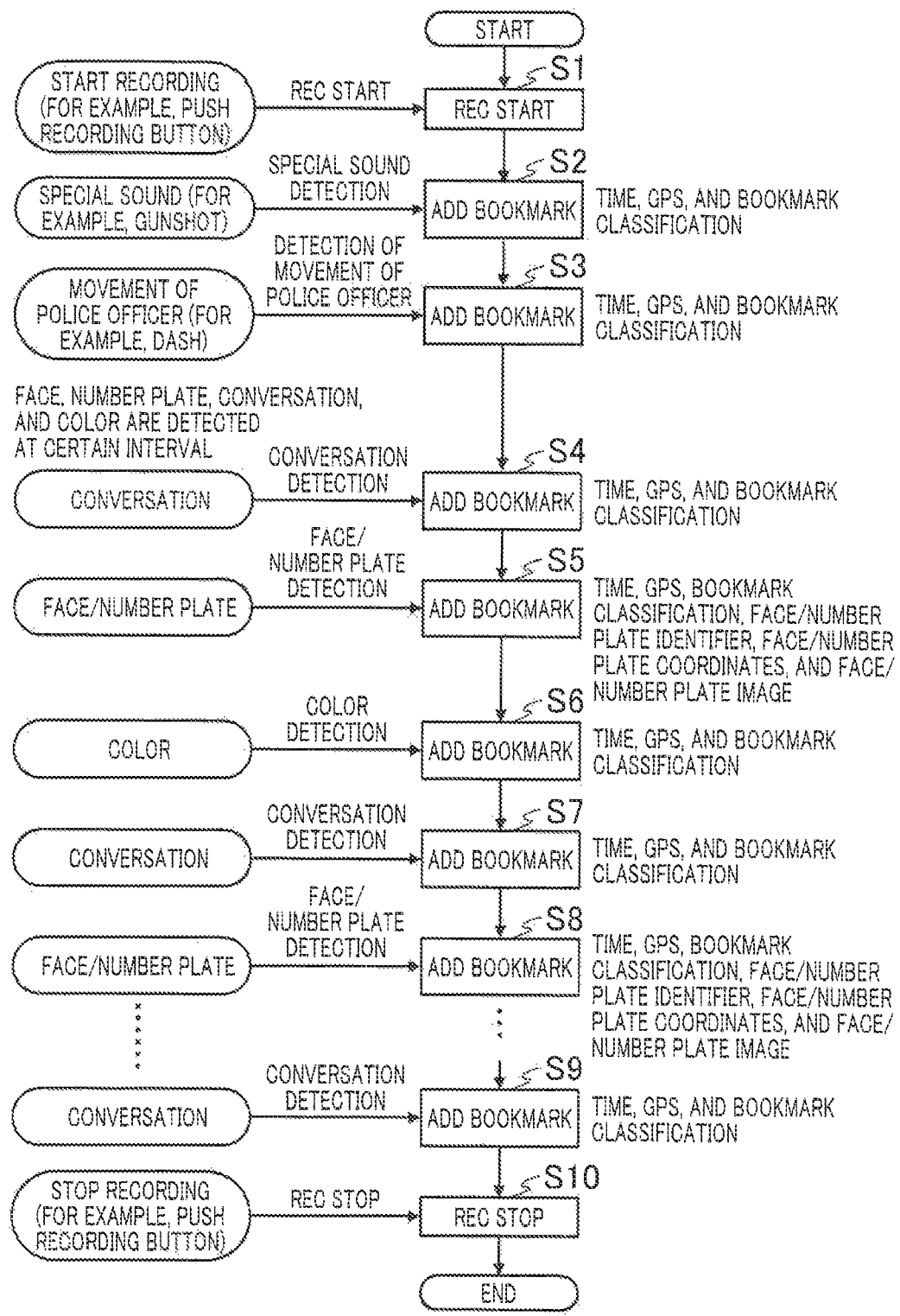
FIG. 16 is a flowchart illustrating an operation example of the wearable camera.

FIG. 16 is a flowchart illustrating an operation example of wearable camera 1. FIG. 16 illustrates the operation example of wearable camera 1 from when the recording starts to when the recording stops. Controller 21 of wearable camera 1 performs pre-recording for a certain amount of time.

Controller 21 of wearable camera 1 starts recording in accordance with the operation of switch 11 by the police officer wearing wearable camera 1 (Step S1). Controller 21 of wearable camera 1 starts recording after going back by a certain amount of time. Note that controller 21 of wearable camera 1 may start recording in accordance with the voice of the police officer wearing wearable camera 1.

Microphone 26 of wearable camera 1 collects special sound. The special sound is a gunshot, for example. When the special sound is collected by microphone 26, controller 21 of wearable camera 1 adds a bookmark to the video data (Step S2). Controller 21 of wearable camera 1 includes the time at which the special sound is detected, the place, and the bookmark classification in the bookmark.

Gyro sensor 23 and acceleration sensor 24 of wearable camera 1 measure the action (movement) of the police officer. The action of the police officer is a dash, for example. When a dash is detected from the action of the police officer measured by gyro sensor 23 and acceleration sensor 24, controller 21 of wearable camera 1 adds a bookmark to the video data (Step S3). Controller 21 of wearable camera 1 includes the time at which the dash of the police officer is detected, the place, and the bookmark classification in the bookmark.

Now, controller 21 of wearable camera 1 may detect a face, a number plate, and color by monitoring the video data captured by camera 22 at a certain interval. Controller 21 of wearable camera 1 may detect a conversation by monitoring the sound collected by microphone 26 at a certain interval.

Microphone 26 of wearable camera 1 collects the sound of the conversation of people. When the sound of a conversation is collected by microphone 26, controller 21 of wearable camera 1 adds a bookmark to the video data (Step S4). Controller 21 of wearable camera 1 includes the time at which the conversation is detected, the place, and the bookmark classification in the bookmark.

Camera 22 of wearable camera 1 takes an image of the face and the number plate. When a face and a number plate are detected from the video data captured by camera 22, controller 21 of wearable camera 1 adds a bookmark to the video data (Step S5). Controller 21 of wearable camera 1 includes the time at which the face is detected, the place, the bookmark classification, the identifier for identifying a face, the coordinates of the face, and a snapshot of the face in the bookmark of the face detection. Controller 21 of wearable camera 1 includes the time at which the number plate is detected, the place, the bookmark classification, the identifier for identifying a number plate, the coordinates of the number plate, and a snapshot of the number plate in the bookmark of the number plate detection.

Note that, in Step S5, camera 22 of wearable camera 1 takes images of the face and the number plate, but may take an image of either one of the face and the number plate. In this case, controller 21 of wearable camera 1 adds the bookmark of either one of the face and the number plate taken by camera 22 of wearable camera 1 in the video data.

Camera 22 of wearable camera 1 takes an image of a building and the like. When a predetermined color is detected in the building and the like taken by camera 22, controller 21 of wearable camera 1 adds a bookmark to the video data (Step S6). Controller 21 of wearable camera 1 includes the time at which the color is detected, the place, and the bookmark classification in the bookmark of the color detection.

Microphone 26 of wearable camera 1 collects the sound of the conversation of people. When the sound of a conversation is collected by microphone 26, controller 21 of wearable camera 1 adds a bookmark to the video data (Step S7). Controller 21 of wearable camera 1 includes the time at which the conversation is detected, the place, and the bookmark classification in the bookmark.

As in Step S5, when a face and a number plate are detected from the video data captured by camera 22, controller 21 of wearable camera 1 adds a bookmark to the video data (Step S8). When the face and the number plate detected from the video data are the same as the face and the number plate in Step S5, controller 21 of wearable camera 1 includes the same identifier as that in Step S5 in the bookmark. When the face and the number plate detected from the video data are different from the face and the number plate in Step S5, controller 21 of wearable camera 1 includes an identifier different from that in Step S5 in the bookmark.

As in Step S7, when a conversation is detected from the sound collected by microphone 26, controller 21 of wearable camera 1 adds a bookmark to the video data (Step S9). Controller 21 of wearable camera 1 includes the time at which the conversation is detected, the place, and the bookmark classification in the bookmark.

Controller 21 of wearable camera 1 stops recording in accordance with the operation of switch 11 by the police officer wearing wearable camera 1 (Step S10). Note that controller 21 of wearable camera 1 may stop recording in accordance with the voice of the police officer wearing wearable camera 1.

Figure 17:
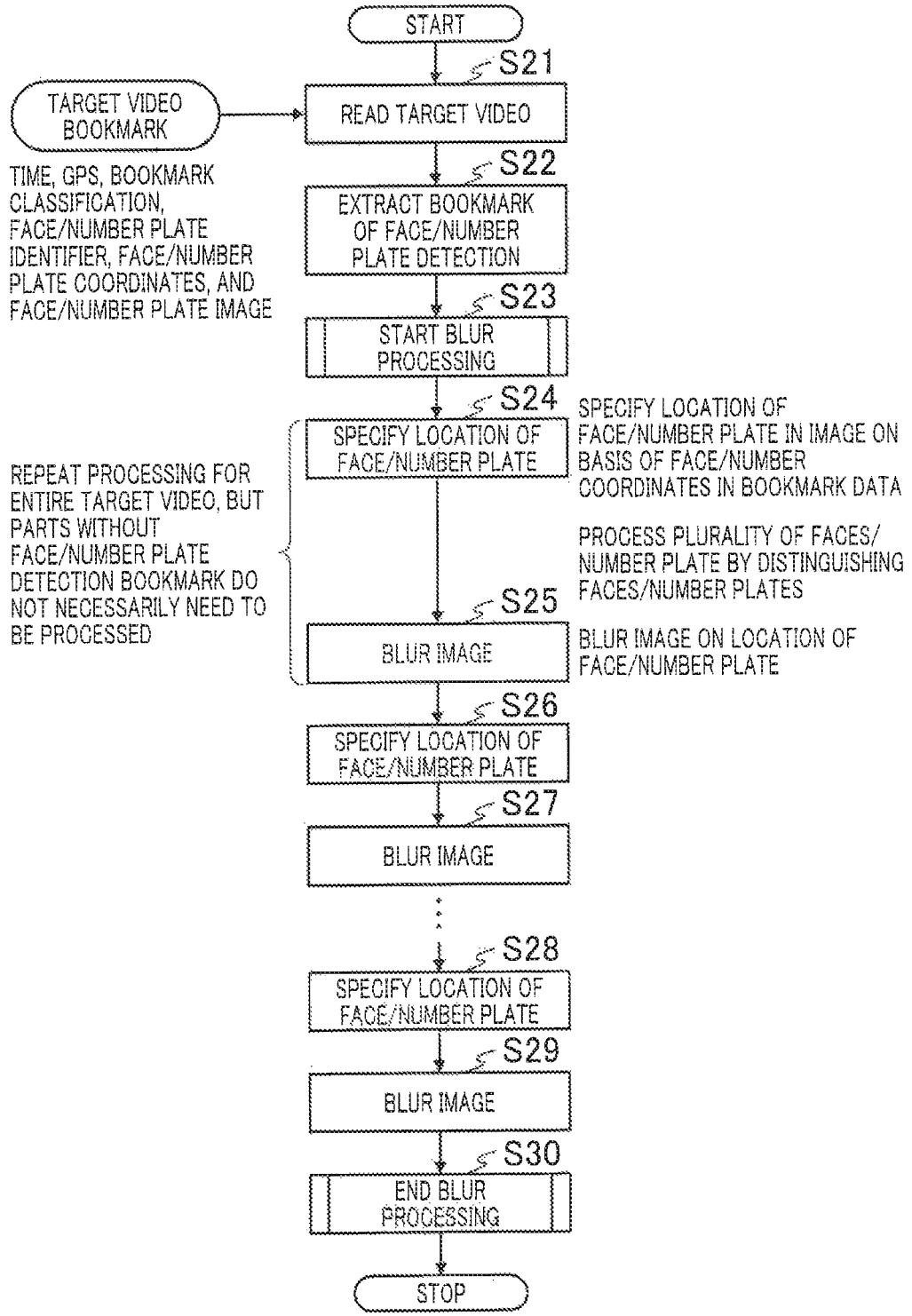
FIG. 17 is a flowchart illustrating an operation example of blur processing of the terminal apparatus.

FIG. 17 is a flowchart illustrating an operation example of blur processing of terminal apparatus 4. Controller 51a of terminal apparatus 4 reads a target video (video data) from server 3 in accordance with the operation by the police officer creating a report, for example (Step S21). At this time, controller 51a of terminal apparatus 4 reads the bookmarks added to the video data.

Controller 51a of terminal apparatus 4 extracts the bookmark of the face detection and the bookmark of the number plate detection out of the bookmarks read in Step S21 (Step S22).

Controller 51a of terminal apparatus 4 starts the blur processing (Step S23).

Controller 51a of terminal apparatus 4 acquires the coordinates of the face and the coordinates of the number plate from the bookmark of the face detection and the bookmark of the number plate detection extracted in Step S22, and specifies the location of the face and the location of the number plate on the image on the basis of the acquired coordinates (Step S24). At this time, controller 51a of terminal apparatus 4 may distinguish the faces included in the image on the basis of the identifiers included in the bookmark of the face detection. Controller 51a of terminal apparatus 4 may distinguish the number plates included in the image on the basis of the identifiers included in the bookmark of the number plate detection. As a result, controller 51a of terminal apparatus 4 can place a blur on faces other than the face of the suspect or the criminal, for example. Controller 51a of terminal apparatus 4 can place a blur on the number plates of vehicles other than the number plate of the vehicle of the suspect or the criminal, for example.

Controller 51a of terminal apparatus 4 places a blur on the locations of the face and the number plate specified in Step S24 (Step S25).

Controller 51a of terminal apparatus 4 performs blur processing of the face and the number plate on the basis of the remaining bookmarks of the face detection and bookmarks of the number plate detection extracted in Step S22 (Steps S26, S27, . . . , S28, and S29).

Controller 51a of terminal apparatus 4 ends the blur processing (Step S30).

As described above, camera 22, storage section 31 that stores therein the video data of the video captured by camera 22, and controller 21 that adds a bookmark to the video data when an event is detected from a signal of the sensor or the video are included. Sensor may be biological sensor 6, gyro sensor 23, acceleration sensor 24, and microphone 26, for example. The bookmark added to the video data is a signal for playing back the video data from a place at which an event is specified in terminal apparatus 4.

As a result, for example, terminal apparatus 4 receives the video data of the video for which report is to be created from server 3 in accordance with the operation by the police officer creating a report on the case. Terminal apparatus 4 can display events on the display apparatus from the bookmarks added to the video data received from server 3 as illustrated in bookmark list 4b in FIG. 4, for example. When an event displayed in bookmark list 4b in FIG. 4 is selected by the police officer, for example, terminal apparatus 4 can play back the video data from the selected event. Therefore, the police officer creating a report can play back the video data from the place (event) necessary for the report creation, and the report creation becomes easier.

Modified Example 1

The in-vehicle camera installed in police vehicle A1 may also add a bookmark to the video data as with wearable camera 1. In-vehicle camera may include a block configuration similar to the block configuration illustrated in FIG. 13, for example. However, the block configuration of the in-vehicle camera does not necessarily need to include gyro sensor 23 and acceleration sensor 24.

Modified Example 2

In the description above, terminal apparatus 4 places a blur on the face and the number plate included in the video, but the present invention is not limited thereto. Server 3 may place a blur on the face and the number plate included in the video. Server 3 may transmit the video data on which a blur is placed to terminal apparatus 4.

Modified Example 3

In the description above, the police officer possesses wearable camera 1, but the present invention is not limited thereto. For example, the security guard may possess wearable camera 1.

Modified Example 4

When a bookmark is selected in bookmark list 4b in FIG. 4, terminal apparatus 4 may display the location information (for example, the address) included in the selected bookmark on the display apparatus. As a result, the police officer can write where the video is captured in the report.

Modified Example 5

In the description above, controller 21 of wearable camera 1 detects an event from the signal of biological sensor 6, the signal of gyro sensor 23 and acceleration sensor 24, the signal of microphone 26, and the video of camera 22, but the present invention is not limited thereto. Controller 21 of wearable camera 1 may detect an event from at least one of the signal of biological sensor 6, the signal of gyro sensor 23 and acceleration sensor 24, the signal of microphone 26, and the video of camera 22. For example, controller 21 of wearable camera 1 may detect an event from two, that is, the signal (sound) of microphone 26 and the video of camera 22.

Embodiment 2

In Embodiment 1, wearable camera 1 monitors the video data captured by camera 22 at a certain interval, and detects a face, a number plate, or color. Then, wearable camera 1 adds a bookmark to the video data each time a face, a number plate, or color is detected.

Meanwhile, in Embodiment 2, wearable camera 1 adds a bookmark to the video data when the detection of a face, a number plate, or color is started, and when a face, a number plate, or color is no longer detected. In other words, wearable camera 1 adds a bookmark to the video data when a face, a number plate, or color enters a video range (capture range), and when the face, the number plate, or the color in the video range exits the video range.

In Embodiment 1, wearable camera 1 monitors the sound collected by microphone 26 at a certain interval, and detects a conversation. Then, wearable camera 1 adds a bookmark to the video data each time a conversation is detected.

Meanwhile, in Embodiment 2, wearable camera 1 adds a bookmark to the video data when the conversation detection is started, and when the conversation is no longer detected. In other words, wearable camera 1 adds a bookmark to the video data when a conversation starts, and when the conversation ends. Parts different from those in Embodiment 1 are described below.

Figure 18:
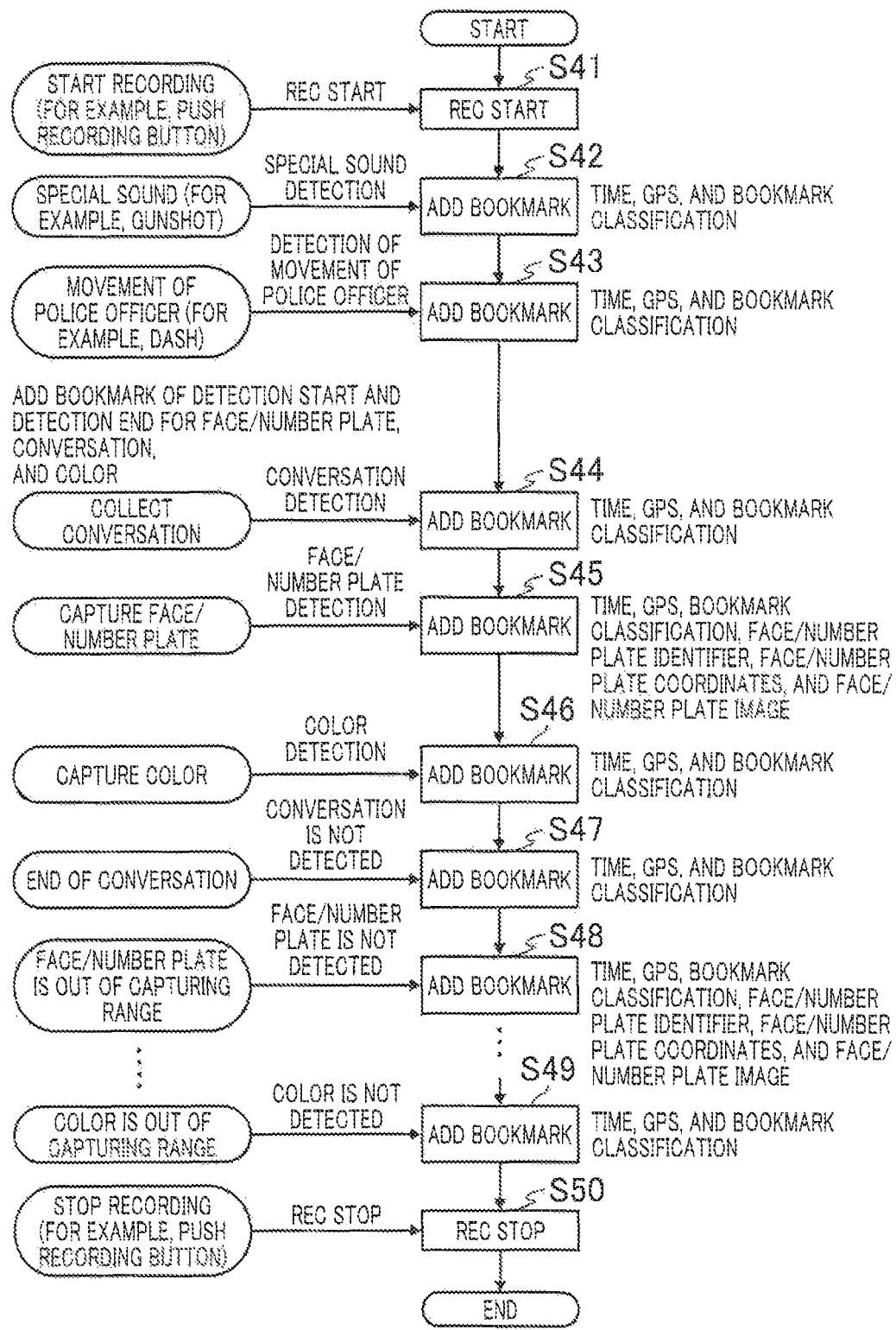
FIG. 18 is a flowchart illustrating an operation example of a wearable camera according to Embodiment 2.

FIG. 18 is a flowchart illustrating an operation example of wearable camera 1 according to Embodiment 2. FIG. 18 illustrates an operation example of wearable camera 1 from when the recording starts to when the recording stops. Controller 21 of wearable camera t performs pre-recording for a certain amount of time.

The processing in Steps S41 to S43 in FIG. 18 is similar to the processing in Steps S1 to S3 illustrated in FIG. 16, and the description thereof is omitted.

Controller 21 of wearable camera 1 may detect a face, a number plate, and color by monitoring the video data captured by camera 22 at a certain interval. Controller 21 of wearable camera 1 may detect a conversation by monitoring the sound collected by microphone 26 at a certain interval.

Microphone 26 of wearable camera 1 collects the sound of the conversation of people. Controller 21 of wearable camera 1 detects the starts of the conversation collected by microphone 26, and adds a bookmark to the video data (Step S44). Controller 21 of wearable camera 1 includes the time at which the conversation is detected, the place, and the bookmark classification in the bookmark.

Camera 22 of wearable camera 1 takes an image of the face and the number plate. When a face and a number plate are detected from the video data captured by camera 22, controller 21 of wearable camera 1 adds a bookmark to the video data (Step S45). Controller 21 of wearable camera 1 includes the time at which the face is detected, the place, the bookmark classification, the identifier for identifying the face, the coordinates of the face, and a snapshot of the face in the bookmark of the face detection. Controller 21 of wearable camera 1 includes the time at which the number plate is detected, the place, the bookmark classification, the identifier for identifying the number plate, the coordinates of the number plate, and a snapshot of the number plate in the bookmark of the number plate detection.

Note that controller 21 of wearable camera 1 does not add the bookmarks for the face and the number plate detected in Step S45 to the video data until the face and the number plate detected in Step S45 exit the video range. Meanwhile, when a face and a number plate that are different from the face and the number plate detected in Step S45 are detected, controller 21 of wearable camera 1 adds bookmarks that are different from those for the face and the number plate detected in Step S45 to the video data.

Camera 22 of wearable camera 1 takes an image of a building and the like. When a predetermined color is detected in the building and the like taken by camera 22, controller 21 of wearable camera 1 adds a bookmark to the video data (Step S46). Controller 21 of wearable camera 1 includes the time at which the color is detected, the place, and the bookmark classification in the bookmark of the color detection.

Note that controller 21 of wearable camera 1 does not add the bookmark for the color detected in Step S46 to the video data until the color detected in Step S46 exits the video range. Meanwhile, when a color of building that is different from the color of the building and the like detected in Step S46 is detected, controller 21 of wearable camera 1 adds a bookmark different from that for the color detected in Step S46 to the video data.

Controller 21 of wearable camera 1 detects the end of the conversation detected in Step S44 (Step S47). Controller 21 of wearable camera 1 includes the time at which the end of the conversation is detected, the place, and the bookmark classification in the bookmark.

Controller 21 of wearable camera 1 detects the end of the image capturing of the face and the number plate detected in Step S45 (Step S48). Controller 21 of wearable camera 1 includes the time at which the detection of the face and the number plate has ended, the place, and the bookmark classification in the bookmark.

Controller 21 of wearable camera 1 detects the end of the image capturing of the color detected in Step S46 (Step S49). Controller 21 of wearable camera 1 includes the time at which the color detection has ended, the place, and the bookmark classification in the bookmark.

The processing in Step S50 in FIG. 18 is similar to the processing in Step S10 illustrated in FIG. 16, and the description thereof is omitted.

As described above, controller 21 of wearable camera 1 adds a bookmark to the video data when a face, a number plate, or color enters the video range, and when the face, the number plate, or the color included in the video range exits the video range. Wearable camera 1 adds a bookmark to the video data when a conversation starts and when the conversation ends. As a result, controller 21 of wearable camera 1 does not need to add bookmarks to the video data at a certain interval, and the processing load cart be reduced.

In the embodiments described above, expressions such as " . . . section", " . . . or", and " . . . er" used in the components may be replaced with other expressions such as " . . . circuitry", " . . . device", " . . . unit", or " . . . module".

The embodiments have been described above with reference to the accompanying drawings, but this disclosure is not limited to those examples. It is clear that a person skilled in the art could conceive of various changes or variations within the scope of the appended claims. The changes or variations as above are also understood to belong to the technical scope of this disclosure. The components in the embodiments may be combined in a freely selected manner without departing from the spirit of this disclosure.

This disclosure can be implemented by software, hardware, or software cooperated with hardware. The function blocks used in the description of the embodiments described above may be partially or entirely implemented as an LSI, which is an integrated circuit, and each of the processes described in the embodiments described above may be partially or entirely controlled by one LSI or a combination or LSIs. The LSI may be formed by individual chips, or may be formed by one chip so as to include a part or all of the function blocks. The LSI may include input and output of data. The LSI may be called an IC, a system LSI, a super LSI, and an ultra LSI in accordance with the difference in the degree of integration.

The method of forming an integrated circuit is not limited to the LSI, and may be implemented by a dedicated circuit, a general purpose processor, or a dedicated processor. An FPGA that is programmable and a reconfigurable processor capable of reconfiguring the connection and the setting of the circuit cell in the LS may be used after manufacturing the LSI. This disclosure may be implemented as digital processing or analog processing.

When technology for forming an integrated circuit that replaces the LSI appears by the progress of the semiconductor technology or another derivative technology, the function blocks may be naturally integrated with use of the technology. The application of the biotechnology and the like is possible.

INDUSTRIAL APPLICABILITY

This disclosure is useful in a wearable camera that records a video.

REFERENCE SIGNS LIST

1 Wearable camera
2 In-vehicle system
3 Server
4 Terminal apparatus
4a Playback screen
4b Bookmark list
5 Network
6 Biological sensor
11, 12, 15, 25 Switch
13 Camera lens
14, 26 Microphone
16a to 16c LED
21, 41a, 51a Controller
22 Camera
23 Gyro sensor
24 Acceleration sensor
27 Speaker
28 Short-range communicator
29 Communicator
30 GPS receiver
31 Storage section
41, 51 CPU
42, 52 RAM
43, 53 HDD
44, 54 Communication interface
45, 56 Bus
55 User interface
A1 Police vehicle
A2 Police station

The invention claimed is:

1. A wearable camera, comprising:
a camera that initiates capturing of a moving image;
a memory that stores therein a video data file of the moving image; and
a controller that automatically adds a bookmark signal to the video data file each time a predetermined event is detected after initiating the capturing of the moving image by the camera, wherein
the controller is configured to add a plurality of bookmark signals to the video data file, each of the plurality of bookmark signals corresponding to one of a plurality of event types, the plurality of event types including at least a special sound event type and an action event type, each of the plurality of bookmark signals indicates a location at which playback of a corresponding portion of the video data file starts, and the captured moving image is continuously recorded while the plurality of bookmark signals is added to the video data file.

2. The wearable camera according to claim 1, wherein the controller includes, in the bookmark signal, time at which the predetermined event is detected, a place, and a classification indicating an event type.

3. The wearable camera according to claim 1, wherein the controller detects the predetermined event from an action of a user wearing the wearable camera, living body information of the user, or a sound around the wearable camera.

4. The wearable camera according to claim 3, wherein the action of the user comprises any one of a dash of the user, a fall of the user, or a fight of the user with another person.

5. The wearable camera according to claim 3, wherein the sound comprises either one of a gunshot or an explosion sound.

6. The wearable camera according to claim 1, wherein the controller adds the bookmark signal to the video data file when at least one of a person, a vehicle, an edged tool, a gun, or a crowd is detected.

7. The wearable camera according to claim 1, wherein, when a face is included in the video data file the controller includes location information indicating a location of the face on an image in the bookmark signal.

8. The wearable camera according to claim 1, wherein, when a number plate is included in the video data file, the controller includes location information indicating a location of the number plate of a vehicle on an image in the bookmark signal.

9. A video playback system, comprising:
a wearable camera that initiates capturing of a moving image; and
a display apparatus that plays back a video data file of a moving image acquired by the wearable camera, wherein:
the wearable camera, comprises:
a memory that stores therein the video data file of the captured moving image; and
a controller that automatically adds a bookmark signal to the video data file each time a predetermined event is detected after initiating the capturing of the moving image by the camera, wherein
the controller is configured to add a plurality of bookmark signals to the video data file, each of the plurality of bookmark signals corresponding to one of a plurality of event types,
the plurality of event types including at least a special sound event type and an action event type,
each of the plurality of bookmark signal indicates a location at which playback of a corresponding portion of the video data file starts; and the display apparatus starts playback of the video data file from a location on the video data file indicated by a corresponding bookmark signal among the plurality of bookmark signals, wherein the captured moving image is continuously recorded while the plurality of bookmark signals is added to the video data file.

10. The video playback system according to claim 9, wherein:
the display apparatus displays a plurality of bookmarks corresponding to the plurality of bookmark signals on a list, and starts playback of a portion of the video data file from a location indicated by a bookmark signal among the plurality of bookmark signals that corresponds to a bookmark selected among the plurality of bookmarks displayed.

11. The video playback system according to claim 9, wherein the display apparatus simultaneously displays a list of the plurality of bookmarks and a video image of the video data file.

12. A video playback method for a video playback system including a wearable camera and a display apparatus that plays back a video data file of a moving image acquired by the wearable camera,
the video playback method comprising:
initiating, by the wearable camera, capturing of a moving image;
storing, by the wearable camera, a video data file of the captured moving image;
automatically adding, by the wearable camera, a bookmark signal to the video data file each time a predetermined event is detected after initiating the capturing of the moving image by the wearable camera, the bookmark signal indicating a location at which playback of the video data file starts, when the video data file is played back; and
starting, by the display apparatus, playback of a portion of the video data file from a location on the video data file indicated by the bookmark signal,
wherein
a plurality of bookmark signals is added to the video data file, each of the plurality of bookmark signals corresponding to one of a plurality of event types,
the plurality of event types including at least a special sound event type and an action event type,
the captured moving image is continuously recorded while the plurality of bookmark signals is added to the video data file.

13. The wearable camera according to claim 1, further comprising a sensor that detects a movement.

14. The wearable camera according to claim 1, further comprising a microphone that detects a sound.

15. The wearable camera according to claim 1, wherein the bookmark signal automatically indicates an event type for the event detected.

* * * * *